2,950,963
PRODUCTION OF METALS

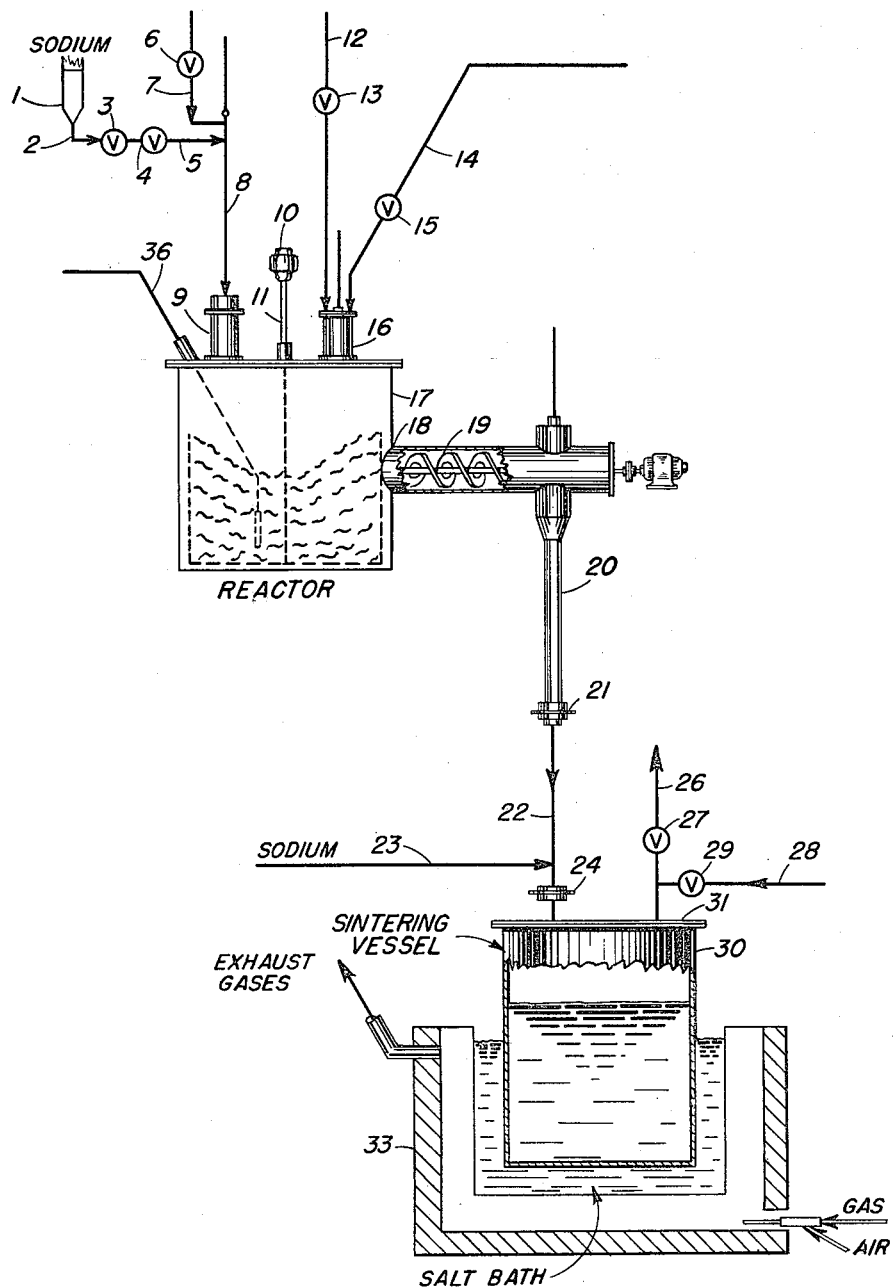

Stuart Schott and Virgil L. Hansley, Cincinnati, Ohio, assignors to National Distillers and Chemical Corporation, New York, N.Y., a corporation of Virginia Filed May 2, 1957, Ser. No. 656,597

14 Claims. (Cl. 75—84.5)

This invention relates to a new process and useful improvements therein for the reduction of reducible compounds of certain multivalent metals to produce the metals in a substantially continuous manner. More particularly, it relates to improvements in the reduction of compounds of multivalent metals with alkali metals and to the subsequent step whereby the finely divided solid reaction product from the reduction step is converted to metallic sponge and/or crystals in more or less massive form.

This application is a continuation-in-part of co-pending application Serial No. 565,898, filed February 16, 1956, now abandoned, which is a continuation-in-part of Serial No. 535,671, filed September 21, 1955, now abandoned.

In known processes for producing these metals, various metal derivatives are reduced using a variety of materials as reducing agents. The usual methods for reducing, for instance, the halides of the multivalent metals by alkali metals, are carried out in the presence of at least an amount of the alkali metal sufficient for stoichiometric reduction. Generally, these methods are actually carried out at relatively high temperatures in which the reduction takes place in a melt or in a fused reaction medium in which the alkali metal reducing agent is present in substantial excess. Such processes give substantially non-crystalline metal products, since the reduction to the metal takes place rapidly and the metal compound is converted to the metal under conditions in which there is no opportunity for crystal growth of the metal. In such operations, the reduction of the metallic compounds and any sponge growth or metal forming phases of the reaction must take place simultaneously and in the same vessel. In many cases, this method of operation unavoidably results in the formation of hot-spots in the reaction mixture where temperatures probably reach the melting point of the metal itself, because fused non-crystalline particles of the metal are common and are frequently found in the final product.

Under such violent reaction conditions, by-product salts and even incompletely reduced subhalides of the multivalent metals become more or less completely surrounded or encased in the final metal product, so that aqueous leaching operations are difficult or impractical. Drainage is used to remove the bulk of the salt by-product while still molten but even after this, the drained sponge or metal mass contains substantial portions of residual salt occluded therein which must be leached out, distilled away, or otherwise removed. It is frequently necessary to carry out complete volatilization of the residual by-products halides and excess reducing metal from the sponge or metal mass using high temperature and high vacuum as in the process where titanium tetrachloride is reduced with magnesium metal. An alternate to such volatilization is the use of extensive leaching operations with relatively strong acids, such as nitric and/or hydrochloric acids. In addition to yielding a metal sponge or mass which is difficult to purify, the simultaneous operation of the complete chemical reduction and the sponge or massive metal growing phases results in the formation of metal product at least a substantial part of which may adhere very tightly to the sides and bottoms of the reaction vessels. For example, in the case of titanium, it may be necessary at times to machine out the titanium sponge using a lathe. These difficulties result in greatly increased cost of operation and variable quality of the product.

It has recently been suggested that titanium metal may be prepared by reacting titanium tetrahalide such as titanium tetrachloride with sodium in a process which involves a separate chemical reduction step and a separate titanium sponge growth step. The chemical reduction step is carried out at a temperature above the melting point of sodium but below melting point of sodium chloride or the melting point of the finely divided reaction mixture. The product of the reaction is a free flowing, finely divided solid, dry mixture of titanium metal and sodium chloride produced according to the following equation:

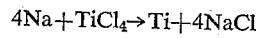

$$4Na + TiCl_4 \rightarrow Ti + 4NaCl$$

In actual operation, both sodium and titanium tetrachloride are metered simultaneously and intermittently or continuously into a stirred reactor to provide a very finely divided powder as the sole product of the reaction, having the composition Ti:4NaCl or about 17% titanium and 83% sodium chloride. As this product fills the reactor, having preferably started with a partial charge of finely divided salt as a "heel," finely divided, solid product is withdrawn, at least intermittently and preferably continuously, by means of, for example, a screw conveyor leading away from the reaction vessel.

A typical system for producing the solid Ti:4NaCl (17% titanium–83% sodium chloride) mixture is described hereinafter. The reactor consists of a reactor vessel, preferably provided with a suitable agitator such as a stirrer which is capable of maintaining agitation of the finely divided, solid reaction product mixture of titanium and by-product salt. Sodium and titanium tetrachloride are fed into this reactor in substantially stoichiometrical quantities at such rates that the temperature is maintained above the melting point of sodium and below the melting point of sodium chloride, but preferably within the range of 125°–200° C. The capacity of such a reactor to produce product varies with the radiation of heat through the vessel walls or other means provided to dissipate the heat of reaction of titanium tetrachloride with sodium. As the reaction continues and the dry reaction product fills the reaction vessel, it is withdrawn either continuously, discontinuously, or at least intermittently from the reaction vessel, as for instance by means of a screw conveyor system attached to the reaction vessel. The dry product is transferred directly into the sintering vessel.

A suitable sintering vessel is provided such as a simple flanged vessel with straight sides and a tightly sealed cover. The cover carries an inlet tube for the Ti:4NaCl powder and an opening for application of an argon blanket.

The finely divided solid titanium-salt mixture is transferred to the sintering vessel and is then brought to a temperature at least above the melting point of sodium chloride (about 800° C.) and held for a specified period of time, for example, by immersing the sintering pot in a fused salt bath furnace maintained at the proper temperature. The titanium-salt mixture is preferably maintained at a temperature of about 850°–1050° C. for a period of about 5 to 20 hours. The sintering pot and contents are then removed from the furnace and allowed to cool to room temperature after which the titanium sponge is removed and recovered. A portion of the by-product salt can be removed by drainage while still molten if desired. It has been found that the titanium product from this process can be readily freed from the by-product salt by washing with water to produce a metallurgical grade titanium sponge.

Several serious difficulties have arisen, however, with the above outlined so-called stoichiometric process which difficulties are mentioned and further amplified hereinafter. Since the Ti:4NaCl powder is a relatively poor conductor of heat, it requires a relatively long period of time, for instance, about 6 or 7 hours, to melt completely the salt in a sintering pot even as small as eighteen inches in diameter. Since sintering of the titanium particles to form sponge does not proceed at an appreciable rate until the sodium chloride by-product is molten, this heating up period represents wasted time insofar as sintering to titanium sponge is concerned. Thus, commercial size sintering pots having diameters up to six feet require completely impractical time periods because of the very large investment in expensive furnaces and sintering pots and the greatly increased heating costs. Although the time required to heat the contents of the sintering pot to the melting point of sodium chloride can be shortened somewhat by raising the temperature of the salt bath or other type furnaces used to heat the sintering pot, this is limited quite sharply by the upper limits of temperature to which practical materials of construction may be exposed, and particularly so when these materials are in contact with the very reactive titanium material.

Difficulties are also encountered in the reduction step of the process due to stickiness and/or formation of lumps. Also, it has been found that even when lumps are not formed, the load on the agitator motor is such that the power required would render the process commercially unattractive on a large scale.

In accordance with the present invention, a number of the major difficulties associated with such a stoichiometric, low temperature reduction process have been eliminated. In general, the invention comprises carrying out the reduction step with a controlled deficiency of the alkali metal, that is strictly controlling the reduction level of the multivalent metal halide. Following the limited reduction step, additional alkali metal is added just prior to and/or during the sintering step for completion on the reduction and formation of the metal. By operating with a stoichiometric deficiency of the alkali metal in the reduction step it is intended to mean that the alkali metal reducing agent is used in amounts at least sufficient to reduce a higher valence halide of the multivalent metal to halides of lower valence, i.e. metal subhalides, but an insufficient amount of the alkali metal is used to form substantial quantities of the corresponding metal.

With titanium as an example, the process of the invention generally comprises reacting titanium tetrachloride and sodium together at a temperature above the melting point of sodium and below the melting point of sodium chloride in accordance with the following reactions:

$$TiCl_4 + Na \rightarrow TiCl_3 + NaCl$$

and/or $$TiCl_4 + 2Na \rightarrow TiCl_2 + 2NaCl$$

The resulting incompletely reduced mixtures are contacted and reacted with the remaining alkali metal necessary for complete stoichiometric reduction of the subhalides to the corresponding metals at temperatures above the melting point of the by-product alkali metal and below the melting point of the metal. Under these conditions the process of the invention yields a crystalline metal product of high purity. Again using the above titanium subhalides as an example, the final reduction takes place as follows:

$$TiCl_3 + 3Na \rightarrow Ti + 3NaCl$$

and/or $$TiCl_2 + 2Na \rightarrow Ti + 2NaCl$$

In order for a compound to function satisfactorily as a starting material feed or the initial reactant for the herein described process, it must be derived from a multivalent metal and must be reducible with an alkali metal reducing agent to a compound in which the multivalent metal has a lower but intermediate valence. In other words, if the starting material is a higher multivalent metal halide, then it must be reducible by the alkali metal to at least one subhalide or a mixture of subhalides of the multivalent metal. The subhalides must in turn be reducible to give the multivalent metal by use of additional reducing agent. Thus, the metal must form, for example, either the pentahalides, tetrahalides, trihalides, or dihalides which will undergo intermediate reduction to tetrahalides, trihalides, dihalides, and/or monohalides which are, in turn, subsequently reducible to the metal.

In carrying out the process of the invention it is preferred that the metal produced as the final product of the reduction melt at least 50 degrees (measured on the centigrade scale) above the melting point of the alkali metal halide by-product. This difference in melting points is important in that the alkali metal halide by-product forms during sintering a molten salt bath which serves as a heat treating medium for the reduced metal and prevents the formation of fused particles of the metal product.

Illustrative heavy metals which may be employed in the present process are classified below in accordance with the Periodic Chart:

| Group IVb: | Group VIIIb (Cont.): |
|---|---|
| Titanium | Rhodium |
| Zirconium | Iridium |
| Hafnium | Nickel |
| Group Vb: | Palladium |
| Vanadium | Platinum |
| Niobium | Group Ib: |
| Tantalum | Copper |
| Group VIb: | Gold |
| Chromium | Group Ia: Cesium |
| Molybdenum | Group IVa: Germanium |
| Tungsten | Rare earths: |
| Group VIIb: | Cerium |
| Manganese | Samarium |
| Technetium | Europium |
| Rhenium | Ytterbium |
| Group VIIIb: | Actinide series: |
| Iron | Uranium |
| Ruthenium | Neptunium |
| Osmium | Americium |
| Cobalt | |

It is also within the scope of this invention to employ metals which have a lower melting point than the alkali metal halide by-product but have boiling points which are sufficiently different to enable the reduced metal and the alkali metal halide to be separated readily. Examples of such metals include:

| | |
|---|---|
| Antimony | Lead |
| Bismuth | Terbium |
| Cadmium | Thallium |
| Gallium | Tin |
| Indium | |

A number of illustrative examples of the partial reduction reaction carried out in accordance with the first step of the inventive process are set forth below:

| | Percent reduction |
|---|---|
| CrCl$_4$+Na→CrCl$_3$+NaCl | 25 |
| and/or | |
| CrCl$_4$+2Na→CrCl$_2$+2NaCl | 50 |
| CrCl$_3$+Na→CrCl$_2$+NaCl | 33 |
| CuCl$_2$+Na→CuCl+NaCl | 50 |
| GeCl$_4$+2Na→GeCl$_2$+2NaCl | 50 |
| AuCl$_3$+2Na→AuCl+2NaCl | 67 |
| HfCl$_4$+2Na→HfCl$_2$+2NaCl | 50 |
| FeCl$_3$+Na→FeCl$_2$+NaCl | 33 |
| MnCl$_4$+2Na→MnCl$_2$+2NaCl | 50 |
| MoCl$_5$+2Na→MoCl$_3$+2NaCl | 40 |
| OsCl$_4$+2Na→OsCl$_2$+2NaCl | 50 |
| PtCl$_4$+2Na→PtCl$_2$+2NaCl | 50 |
| RuCl$_3$+Na→RuCl$_2$+NaCl | 33 |
| TiCl$_4$+Na→TiCl$_3$+NaCl | 25 |
| and/or | |
| TiCl$_4$+2Na→TiCl$_2$+2NaCl | 50 |
| TiCl$_3$+Na→TiCl$_2$+NaCl | 33 |
| WCl$_5$+3Na→WCl$_2$+3NaCl | 60 |
| UCl$_5$+Na→UCl$_4$+NaCl | 20 |
| and/or | |
| UCl$_5$+2Na→UCl$_3$+2NaCl | 40 |
| UCl$_4$+Na→UCl$_3$+NaCl | 25 |
| VCl$_4$+2Na→VCl$_2$+2NaCl | 50 |
| ZrCl$_4$+2Na→ZrCl$_2$+2NaCl | 50 |
| IrCl$_3$+Na→IrCl$_2$+NaCl | 33 |
| TaCl$_5$+Na→TaCl$_4$+NaCl | 20 |
| NbCl$_5$+Na→NbCl$_4$+NaCl | 20 |
| SbCl$_5$+Na→SbCl$_4$+NaCl | 20 |
| PbCl$_4$+2Na→PbCl$_2$+2NaCl | 50 |

Thus, the reduction reaction of the multivalent metallic halide may be interrupted at the desired reduction level, for instance, 20% reduction, 25% reduction, 50% reduction, 75% reduction, and up to 80–90% reduction. This is done most conveniently by controlling the amount of alkali metal added. The only important requirement at this stage of the process is that the reaction product be an easily transportable, substantially solid powder which is insensitive to temperature, i.e., it is not likely to form melts which solidify to concrete-like material should the reaction, momentarily and in isolated zones, become several hundred centigrade degrees higher due to a momentary unbalance of raw material feeds and/or temporarily uncontrolled conditions.

In order to produce a free flowing solid powder of the corresponding subhalides admixed with the salt by-product, it is essential to use at least a sufficient amount of the alkali metal, for example, sodium, to reduce the metal compound to the subhalides, for example, titanium tetrachloride is reduced substantially to the subhalides, titanium trichloride and/or titanium dichloride. Proportions of alkali metal reducing agent less than this amount will leave some unreacted titanium tetrachloride which will wet and/or form low melting eutectic compositions with the product and somewhat hinder its free-flowing properties. The partial reduction can be carried out by using up to 90% of the theoretical alkali metal necessary for complete reduction to the metal and thus still retain a major portion of the advantages of the invention. Above 90% reduction there is not sufficient heat released by the reaction of the relatively small proportion of remaining alkali metal to decrease the heat-up time of the sintering step to any marked degree. Also, in the ranges of 80 to 90% reduction relatively larger amounts of the starting halide reactant are completely reduced to metal and some of the disadvantages of stoichiometric reduction are present.

When the reduction reaction is run at stoichiometry, i.e., for instance, feed rates at the ratio of at least four moles of sodium per mole of titanium tetrachloride, it is difficult to maintain for extended periods as are required for continuous operation an easily stirred, fluidizable powder. This is clearly evidenced by the power requirement on the agitator motor which stirs the reduction mixture. Any feed ratio which gives a product below the Ti:4NaCl ratio e.g., even with sodium at 90% of theoretical, immediately reduces the power load.

TABLE I

| Run No. | Deficiency of Sodium below theoretical Amount, Percent | Percent Reduction | Amps. Load |
|---|---|---|---|
| 1 | 0 | 100 | 7.5 |
| 2 | 0 | 100 | 8.9 |
| 3 | 10 | 90 | 5.0 |
| 4 | 25 | 75 | 4.3 |
| 5 | 25 | 75 | 4.0 |
| 6 | 35 | 65 | 4.4 |
| 7 | 45 | 55 | 4.4 |
| 8 | 75 | 25 | 4.9 |

Table I records a series of load figures in A.C. amps, to the motor, showing that the use of a sodium deficiency reduces the power required by about 50%. Another evidence of this easier fluidization is in the character of the reduction product. When operating the low temperature reduction to produce a material corresponding to Ti:4NaCl, a coarse, granular, gray product is usually obtained at least in part. Such a product tends to be much less colloidal and at times contains small spheres of bright metallic titanium of a much greater apparent density although this titanium does have incorporated therein some by-product salt. In general, the less finely divided the titanium-sodium chloride powder from the first step, the less well sintered will be the resulting titanium sponge after the heat-treating step. Operating at the stoichiometric ratio to give the approximate theoretical Ti:4NaCl mixture produces at least small proportions and frequently larger amounts of globules or pellets of titanium metal, usually −20 mesh. These, being of greater density, tend to remain in the reduction vessel while the finer powdery material is permitted to overflow continuously or is at least intermittently removed from the reactor. Thus, the heel remaining in the pot containing these particles of titanium metal becomes heavier with the passage of time causing higher power requirements on the stirrer during extended periods of continuous or semi-continuous operations.

However, by withholding a substantial portion (10–75% and up to 80%) of the alkali metal requirement in the low temperature reduction stage, the tendency to form this coarse globular product disappears. For instance, the entire production product, composition of TiCl$_x$:(4−x)NaCl (where $x$ is less than 4 but at least one or more) is a finely divided and free-flowing, dark colored powder.

Temperatures of reaction ranging from the melting point of the alkali metal up to the melting point of the by-product alkali metal halide or the melting point of the reaction mixture can be used. The preferred range is from about 150° C. up to about 400° C. Operating at sodium level rates of only 25–50% of theoretical, the preferred temperature range is 150°–175° C. At higher levels of the alkali metal, for instance, sodium usage of 75–90% of theory in the reduction step, the preferred temperature range is 200°–250° C. This is because the subsequent reactions of sodium with subhalides of titanium, TiCl$_3$+Na→TiCl$_2$, are somewhat less exothermic than the first stage of the reaction in which TiCl$_4$ is reduced to TiCl₃. The amounts of heat evolved at each stage of reduction are as follows:

First Cl removed from TiCl₄—ΔH→78.9 Cal./mol.
Second Cl removed from TiCl₄—ΔH→49.8 Cal./mol.
Third and fourth Cl, average—ΔH→36.7 Cal./mol.

A further difficulty with commercial operation of the stoichiometric process is that adequate means must be supplied for removal of heat in the reduction step following which large quantities of heat must be supplied to raise the temperature of the finely divided reaction product to melt the by-product salt contained therein for the sintering step. Using the herein described process, the desired portion of the heat from the reduction is very simply controlled and utilized in the sintering step with obvious economic and practical advantages.

For example, from the heat of reaction values above, the larger portion of the total reaction heat in the reduction of titanium tetrachloride to metallic titanium with sodium is given off at approximately the 50% reduction stage. However, by reaction of the lower titanium chlorides with sodium, sufficient reaction heat is obtained to raise the temperature of the TiCl$_x$:(4−x) NaCl mixture to the sintering temperature in the range of 805° C. to 1050° C. when the additional sodium necessary for stoichiometric reduction is added and allowed to react. It has been shown that, as the amount of sodium added to the sintering pot for stoichiometry becomes larger, the heat-up time for the charge decreases markedly. Using the completely reduced mixture, Ti:4NaCl, 6 to 8 hours are required to raise the contents of an 18-inch sintering pot to the required temperature of about 900° C. On the other hand, at the 55% reduction level, enough reaction heat is released in the sintered mixture by addition of the remaining sodium required for stoichiometric reduction to raise the temperature to the sintering point in less than two hours. This amounts to a tremendous saving in sintering time and very expensive furnacing equipment. Furthermore, this more efficient method of supplying and controlling heat internally makes the process independent of the size of the sintering equipment, i.e., a 40-inch diameter sintering vessel can be heated up as readily and as rapidly as a 10-inch pot.

It was also discovered that when operating the process with a deficiency of sodium at the reduction stage and then allowing the reaction to go on to completion in the sintering vessel, a more coherent titanium sponge was produced. Sponge prepared in this way does not crumble so readily during processing to form a less desirable powdery material as does the sponge obtained by complete reduction in the low temperature reduction step using substantially stoichiometric amounts of reactants. More important, it was found that by permitting the reaction to complete itself in the sintering vessel there is obtained a metal product which is more crystalline in structure, for instance, there is obtained a titanium sponge which is more crystalline and presents much less titanium surface to leaching liquors and to the air. In other words, titanium sponge formed by this new method of operation has a much lower specific surface, and is less sensitive to the action of water in the leaching process. Hydrolysis reactions of sensitive titanium surfaces produce insoluble titanium compounds which adhere to the titanium metal surface and cause high oxygen values in the titanium ingot with consequent increased hardness.

It appears that reduction at higher temperatures under these controlled conditions favors a more dense and more crystalline metal sponge. It has been noted that the crystallinity of the sponge can also be controlled by the rate at which the completion of the reduction reaction is allowed to take place. If this last part of the reduction is made to take place rapidly then the crystals are of a fine character. If, on the other hand, the alkali metal is added slowly so that the addition takes place over a period of time, such as from 10 to 50% of the total sintering time, then the crystals are relatively large. It appears that persistence for a time of a considerable concentration of the subhalides is necessary for the development of crystallinity, especially of large crystals, in the metal sponge. Crystallinity in sponge is characteristic of low specific surface. Operating by this process, using sodium as the alkali metal reducing agent, large crystals of massive titanium have been produced. Such large titanium crystals as have thus been obtained have Brinnell values in the range of 60–70 which is comparable to so-called "iodide" sponge. Some reactions involved in the salt solution may include any or all of the following:

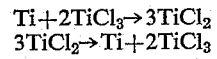
Ti+2TiCl₃→3TiCl₂
3TiCl₂→Ti+2TiCl₃

Reactions of sodium vapor or sodium dissolved in the molten salt with the titanium subhalides may also produce titanium metal crystals as follows:

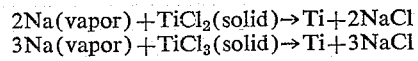
2Na(vapor)+TiCl₂(solid)→Ti+2NaCl
3Na(vapor)+TiCl₃(solid)→Ti+3NaCl

Thus, it is a further feature to operate the process in such a fashion at the beginning of the sintering stage so that the remaining alkali metal required for stoichiometry is not added all at once at the start. Thus, another method of operation is to schedule the addition of a part of the remaining alkali metal at the start of the sintering period to gain advantage of heating the reaction mixture rapidly to the required temperature for fusion of the salt and to follow this with the addition of the remainder of the required sodium somewhat later. For example, the sintering of a 50% reduction mixture of subhalides and by-product alkali metal halide might be carried out as follows: 35% of the theoretical sodium is initially added to the partially reduced reaction mixture which makes a total of 85% of the theoretical sodium required. The sintering vessel is then placed in the furnace where the free sodium present reacts rapidly with the subhalides and the internal temperature rose rapidly above the melting point of the sodium halide. If the subhalides are subchlorides, the internal temperature in the sintering pot is allowed to reach about 900° C., and is held at this temperature for six hours. At this time the remaining sodium necessary for the stoichiometric reduction is added, i.e., the final 15% of the theoretical sodium required for reduction of the titanium tetrachloride to titanium metal. The sintering pot is then held at the sintering temperature for another ten to sixteen hours to complete the metal crystal and/or sponge formation step.

Another method of completing the reduction can be carried out by the addition of 25% of the theoretical sodium followed by placing the sintering vessel in the furnace. The temperature is allowed to rise to 875° C. over the next three hours; the remaining sodium necessary for stoichiometric reduction being added in equal increments, additions being spaced at 15 minute intervals during this period. It is found that the sintering operation is essentially completed at the end of the three hour period, although longer heating periods may be used with no adverse effects.

Another important advantage of the present method of operation is the additional amount of control it permits over the character of the sponge obtained. For certain purposes, a dense heavy crystalline sponge is desirable, particularly if the sponge is to be converted into massive metal by the consumable electrode technique as is for instance, the case with titanium. On the other hand, if the metal is to be used for powder metallurgy or for a flash powder, it then becomes desirable to operate the process in such a manner as to produce substantially all of the sponge at a mesh size of −20. Screen analyses on product from runs employing varying sodium deficiencies are shown in Table II.

It is shown in the preparation of titanium for instance, that as sodium deficiencies in the reduction step become greater, the proportion of metal fines, that is, particles passing through a 60 mesh screen, is markedly decreased.

TABLE II

| Run No. | Wt. Percent −60 mesh | Deficiency, percent | Percent Sodium added in reduction step |
|---|---|---|---|
| 1 | 22.7 | None | 100 |
| 2 | 28.8 | None | 100 |
| 3 | 26.3 | 10 | 90 |
| 4 | 7.0 | 25 | 75 |
| 5 | 7.6 | 25 | 75 |
| 6 | 7.4 | 25 | 75 |
| 7 | 11.9 | 35 | 65 |
| 8 | 4.5 | 45 | 55 |
| 9 | 4.0 | 75 | 25 |

In other titanium manufacturing processes, substantial quantities of titanium subhalides are entrapped in the sponge even though some excess of reducing metal has been employed. The possibility of the presence of subhalides in the sponge makes imperative the use of a strong acid leach liquor when salt is separated by aqueous leaching. The acid in the leach liquor holds in solution titanium subhalides such as titanium trichloride and dichloride and tends to stabilize these halides against oxidation as well as hydrolysis. This stabilization operates for a sufficient length of time to prevent the precipitation of insoluble oxides of titanium on the titanium metal surface. Once such oxides have precipitated on a metal surface, they are difficult to dissolve away again without loss of titanium metal.

The technique herein described for reducing the specific surface of titanium to render it more insensitive to water, coupled with completeness of the reduction to the point where substantially no subhalide remains, allows the use of essentially neutral aqueous leaching. This is a tremendous saving over processes which (a) not only require the use of two to four pounds of mineral acid per pound of titanium sponge produced in order to yield a titanium sponge with an oxide-free surface but (b) which also produce a leach liquor requiring extensive treatment in order to recover the sodium chloride values therein. Although the sponge from the stoichiometric process can be washed suitably with water, the sponge obtained by the improved process due to its more open structure is more easily washed with water to low chloride and sodium content. This is shown by reduced amount of chlorine and sodium in the sponge. This difference can be observed quite readily in the lesser tendency for smoking or boiling away of sodium chloride when arc melting the sponge obtained by the invention than that obtained by the stoichiometric process.

The invention will be further described and illustrated by the following examples, although it is not desired to limit the invention in any manner specifically thereto. All parts are by weight unless otherwise specified. While there are disclosed below but a limited number of embodiments of the invention herein presented, it is possible to produce still other embodiments without departing from the inventive concept herein disclosed.

*Example 1*

The equipment and details of the stoichiometric process are shown in the accompanying figure which is a schematic drawing, the operation of which is described below. Referring to the drawing, reactor 17, is provided with agitator 11, consisting of a power source 10 and suitable supports, shaft, and propeller and/or blades adapted to keep the reactor contents in a state of agitation. Provision is made for the continuous or at least semi-continuous introduction into reactor 17 of sodium from tank 1 through lines 2, 5 and 8, through which the flow is controlled by valves 3 and 4, and thence into the reactor by inlet pipe 9. Inert gas such as argon may be introduced into the reactor zone by line 7 controlled by valve 6. Provision is also made for the introduction into reactor 17 of titanium tetrachloride via line 14, controlled by valve 15, and thence into the reactor by inlet pipe 16. Inert gas may additionally or alternatively be introduced via line 12 controlled by valve 13. The temperature is measured and controlled by means of thermocouple 36. Suitable heating and/or cooling means are employed in conjunction with reactor 17.

A stoichiometric titanium and by-product salt mixture (Ti:4NaCl) from 2090 parts of sodium and 4380 parts of titanium tetrachloride is prepared by charging the aforesaid reactants in a continuous manner into stirred reactor 17 maintained under an argon blanket. The reaction temperature is controlled at about 250–300° C. The titanium-salt powder is discharged via outlet 18 as formed, after a heel of approximately 1500 parts of the finely divided mixture has been built up in reactor 17, into a sintering vessel.

The finely divided solid mixture which consists substantially of sodium chloride and titanium is discharged via outlet 18 from reactor 17 through pipe 19 which is suitably equipped with a screw device or other conveyor system for transferring finely divided solids. The finely divided solids in line 18 are discharged into line 20, in which flow is controlled by slide valve 21, and thence they pass into line 22. When operating under stoichiometric conditions, substantially no additional sodium is added to the sintering vessel. The solid mixture is passed through slide valve 24 into sintering vessel 30, which is constructed of a heat resistant metal, has a cover 31 and preferably at least carries a liner of mild steel. The contents of sintering vessel 30 are likewise maintained under a blanket of inert gas which is vented, if desired, via pipe 26 controlled by valve 27. Additional inert gas may be introduced via line 28, controlled by valve 29. The sintering vessel, after filling, is transferred to a molten salt bath 33 suitably equipped for heating and for inlet gas and air and outlet exhaust gases.

Previously, the sintering vessel is cleaned, purged with argon, and then evacuated after heating to a dull red. It is then filled with argon and allowed to cool prior to charging the titanium-salt powder which consists of the approximate stoichiometric composition of 17% titanium and 83% sodium chloride. The temperature of the salt bath is controlled at 950° C. and it requires 7.5 hours for the contents of the sintering vessel to reach 900° C. at which temperature they are maintained for 20 hours.

The sintering vessel is removed from the salt bath and then while the contained by-product salt is still molten, it is laid on its side. This permits the molten salt to drain away from the titanium sponge. The lid is removed and the titanium sponge recovered by washing with water to remove sodium chloride followed by drying. The recovered titanium sponge had the following analysis:

| | |
|---|---|
| Brinell hardness | 163 |
| Sodium percent | 0.05 |
| Chloride do | 0.098 |
| Nitrogen do | 0.04 |
| Oxygen do | 0.10 |

*Example 2*

The equipment and details for the process of this invention are described hereinafter. The general operation of the process is essentially the same as that described in Example 1, the description below being only one specific embodiment of the invention. Referring again to the accompanying drawing, schematic reactor 17 is provided with agitator 11, consisting of a power source 10 and suitable supports, shaft, and propeller and/or blades adapted to keep the reactor contents in a state of agitation. Provision is made for the continuous or at least semi-continuous introduction into reactor 17 of sodium from tank 1 through lines 2, 5 and 8, through which the flow is controlled by valves 3 and 4 and thence into the reactor by inlet pipe 9. Inert gas, for instance argon, is introduced into the reactor zone by line 7 controlled by valve 6. Provision is also made for the introduction into reactor 17 of titanium tetrachloride via line 14, controlled by valve 15, and thence into the reactor by inlet pipe 16. Inert gas may additionally or alternatively be introduced via line 12 controlled by valve 13. The temperature is measured and controlled by means of thermocouple 36. Suitable heating and/or cooling means are employed in conjunction with reactor 17.

A mixture consisting substantially of titanium subhalides and by-product salt from 1360 parts of sodium (64% of the amount for theoretical reduction) and 4380 parts of titanium tetrachloride is prepared by charging the aforesaid reactants in a continuous manner into stirred reactor 17 maintained under an argon blanket. The reaction temperature is preferably controlled at about 150–175° C. The titanium-salt powder is discharged via outlet 18 as formed after a heel of approximately 1500 parts of the finely divided mixture has been built up in reactor 17 into a sintering vessel.

The finely divided solid mixture is discharged via outlet 18 from reactor 17 through pipe 19 which is suitably equipped with a screw device or other conveyor system for transferring finely divided solids. The solids in line 18 are discharged into line 20, in which flow is controlled by slide valve 21, and thence pass into line 22. Additional sodium required for completion of the reduction and optimum heat soaking conditions is added via line 23. The solid finely divided mixture is passed through valve 24 into sintering vessel 30, which is constructed of a heat resistant metal, has a cover 31 and preferably at least carries a liner of mild steel. The contents of sintering vessel 30 are likewise maintained under a blanket of inert gas which is vented, if desired, via pipe 26 controlled by valve 27. Additional inert gas may be introduced via line 28, controlled by valve 29. This sintering vessel may be provided with agitation means if desired. The sintering vessel is eventually positioned within a molten salt bath 33 suitably equipped for heating and for inlet gas and air and outlet exhaust gases.

The sintering vessel is previously cleaned, purged with argon and then evacuated after heating to a dull red. It is then filled with inert gas such as argon and is allowed to cool prior to charging the mixture of fine powder consisting substantially of titanium subchlorides and sodium chloride.

760 parts of sodium is added to the sintering vessel through line 23 controlled by valve 24. The sintering vessel is lowered into a fused salt bath furnace maintained at 900° C. A period of 2½ hours is required for the contents of the sintering vessel to reach 805° C., the melting point of sodium chloride. The temperature is allowed to increase to 900° C. and held there for a period of 20 hours for sponge growth.

The sintering vessel is removed from the furnace, placed on its side prior to freezing of the by-product salt, and allowed to cool to room temperature. The salt-sponge mixture is removed from the vessel and the titanium sponge crushed through a jaw crusher having ½ inch clearance and then washed free of salt and dried. The average hardness was 146 Brinell. Particle size distribution was 90 parts, +60; 4 parts, +100; and 4 parts −100 mesh size.

*Example 3*

A quantity of 164 parts of TiCl₄ was reacted with ¾ (75%) enough sodium for complete reduction in a continuous manner at a temperature of about 150° C. as described in preceding Example 2. The amount of sodium added for this partial reduction amounted to 58.8 parts. The sintering vessel was then disconnected from the reduced, and the additional sodium necessary for complete reduction, 21.0 parts, was run into the sintering vessel containing the titanium subhalides-salt powder mixture. The sintering vessel was then placed in a fused salt bath held at 900° C. where a period of about 3 hours was required for the vessel to reach the melting temperature of sodium chloride (805° C.) after which the temperature was raised to 900° C. and held for a 20 hour period at this temperature to allow sponge growth.

The sintering vessel was removed from the furnace and allowed to cool to room temperature while blanketed with argon. The salt-sponge mixture was removed from the vessel, the titanium sponge washed free of salt and dried. A titanium sponge was recovered which consisted of 92.5 parts, +60; 3.2 parts, +100; and 4.4 parts, −100 mesh size. The average Brinell hardness on this material was 126; chloride, 0.054%, sodium, 0.019%.

*Example 4*

In another experiment, a total charge of 142 parts of TiCl₄ was reacted in a continuous manner with 43.7 parts of sodium at a temperature of 150° C. This amount of sodium was only 65% of that theoretically required for complete reduction of the titanium tetrachloride to titanium metal. At this point the sintering vessel was disconnected as above described from the reducer and an additional 24.8 parts of sodium added to the sintering vessel. The sintering vessel was lowered into a fused salt bath held at 900° C. Due to the heat of reaction released upon completion of the reduction, the heat-up period was shorter than that in the previous example. In this case 2.5 hours were required to reach the melting point of salt. After this initial heat-up period, a soaking period of 20 hours additional at 900° C. was allowed for sponge growth. The sintering vessel was then removed from the furnace, and cooled under an argon blanket to room temperature. The titanium sponge was removed, washed free of salt with water and dried. A yield of 84% of titanium sponge was obtained which had a Brinell hardness of 156.

*Example 5*

A charge of 133 parts of TiCl₄ was reacted as above described with 32.5 parts of sodium (50% of theoretical) in a continuous manner at a temperature of 150° C. These amounts of reagents yielded a reduction mixture in which the titanium tetrachloride was substantially reduced to titanium dichloride. At this point the remainder of the required sodium, 32.6 parts, was added into the top of the sintering vessel just before placing the sintering vessel into the furnace which was held at 900° C. A period of 45 minutes was required to bring the temperature of the contents of the sintering pot to the melting point of sodium chloride, after which 20 hours' additional time at 900° C. was allowed for completion of sponge growth. The sintering vessel was removed from the furnace as above, cooled, opened and the titanium sponge-salt mixture removed for washing. In this case the sponge was washed with 1% HCl and then with water. The titanium sponge obtained had a Brinell hardness of 130.

*Example 6*

A charge of 134 parts of TiCl₄ was reacted in a continuous manner with 64.5 parts of sodium at a temperature of 150° C. This amount of sodium corresponded very approximately to the theoretical amount required for the complete reduction of this amount of titanium tetrachloride to titanium metal. At this point, the reduction step was interrupted and the sintering vessel disconnected from the reduction vessel and placed in a fused salt bath automatically held at 900° C. Due to the fact that the reduction reaction was completed no heat was evolved and the heat-up period required for reaching the melting point of sodium chloride was 7 hours. After this temperature was reached, the sintering vessel and contents were allowed to remain at 900° C. for 25 hours. After cooling, washing and drying, the sponge yield was 91.7%. Of this material 87% remained on a 60 mesh screen, 13.4% on a 100 mesh screen with 9.3% through the 100 mesh screen. The Brinell hardness of this titanium sponge was 179.

Example 7

A quantity of 190 parts TiCl₄ was reacted as described above with 62 parts of sodium at a temperature of 250° C. This amount of sodium was 67.5% of that required to reduce titanium tetrachloride to titanium metal. The powdery mixture was transferred continuously from the reactor to a sintering vessel as shown in the accompanying figure. The sintering vessel was disconnected from the system while being maintained at all times under an argon atmosphere. An additional 30.5 parts of sodium were added to the sintering vessel after which it was lowered into a fused salt bath at 850° C. The temperature increased to 100° C. in ten minutes and then increased very rapidly due to reaction of the sodium and lower chlorides of titanium. At the end of 55 minutes the temperature was 800° C. and at the end of 75 minutes the temperature was 900° C. It was held at 900° C. for ten hours following which the sintering vessel was removed from the furnace and allowed to cool. The titanium sponge was recovered from the salt by leaching out the latter with water. The titanium sponge had a Brinell hardness of 122.

Example 8

The same procedure was followed as described in Example 7 except that the contents of the sintering vessel were heated for 5 hours at 980° C. The recovered titanium sponge appeared identical to that recovered in Example 7. Brinell hardness was 131.

Example 9

The preparation of the finely divided titanium dichloride-salt mixture was identical with that of Example 5. To this mixture in the sintering vessel was added 16 parts of sodium following which the vessel was immersed in the furnace. The temperature was allowed to rise to between 850 to 875° C. The remainder of the sodium for stiochiometry was added in increments of 2 parts each at intervals of 15 minutes. The vessel and contents were then held at 900–950° C. for one hour following which they were removed from the furnace. The vessel was turned on its side to allow the molten salt to drain away from the titanium sponge and crystals. After cooling to room temperature, the titanium metal was removed and separated from the salt. About fifty percent of the recovered metal was in the form of crystals. Average hardness of a composite sample of the titanium metal product was 122 Brinell.

Example 10

The vaporizer was charged with 205 parts of ZrCl₄. 71.5 parts was purged to remove low boiling impurities and then 49.5 parts of ZrCl₄ was sublimed into the reducer at a temperature above 331° C. During the addition of the ZrCl₄ there was also added 9.75 parts of sodium, a quantity sufficient to reduce the ZrCl₄ to the divalent state. Both reactants were fed and reacted in a continuous manner at a temperature between 265–575° C. onto a bed of finely divided salt and zirconium subchlorides.

The solid, finely divided reduction product of this low temperature step was passed into a purged, argon filled sintering retort by means of a screw conveyor, the entire system being maintained under a pressure of argon.

The charged sintering pot was then placed into a 900° C. salt bath and an additional 9.75 parts of sodium was added slowly to complete the stoichiometric reduction. The pot and its contents were heated for a period of two and a half hours, then tilted to drain the molten salt from the sponge.

The product recovered from the cooled pot was a very dense sponge that had a BHN value of 179.

Example 11

To a stirred bed of sodium chloride and zirconium subchlorides, maintained between 325 and 400° C., 146.5 parts of ZrCl₄ vapor and 25.2 parts of molten sodium were added and the tetrachloride reduced in a continuous manner. The mixture of essentially divalent zirconium chloride and sodium chloride obtained from the reduction is transferred to a sintering vessel that had been pre-charged with 25 parts of sodium to complete the reduction.

The sinter pot and its contents were placed into a 700° C. salt bath and heated to 900° C. for two hours. The recovered, acid leached zirconium sponge had a 159 BHN.

Example 12

The initial step of this two-step reduction process was made by reacting 82.7 parts of zirconium tetrachloride and 16.3 parts of sodium continuously on a stirred salt bed. The reduction temperature ranged from 165 to 600° C. and ninety-nine pounds of 50% reduction product was transferred by means of a screw conveyor to the sintering pot. The sintering pot and contents were placed into an 800° C. salt bath and an additional 16.3 parts of sodium were added to complete the reduction. The temperature of the bath was raised to 925° C. for two hours, with the pot contents rising to 820° C. for the same period.

The pot was tilted while at this elevated temperature to allow the salt to drain from the sponge and on cooling to room temperature a 217 BHN zirconium sponge was recovered.

Example 13

445 parts of ZrCl₄ powder and 88 parts of molten sodium were reacted as described previously to give a 50% reduced product consisting of by-product salt and substantially zirconium dichloride. Reaction temperature ranged from 150 to 400° C. depending on the rate of addition of sodium and ZrCl₄. The 50% reduction powder was transferred to a sintering tube containing 88 parts of sodium, the remainder required to complete stoichiometric reduction. The sintering of the charge was carried out for 4 hours in the 900° C. salt bath. The metal sponge saturated with dark gray salt was removed from the sinter pot and after washing yielded 155 parts of zirconium sponge, which corresponded to an 88.5% yield.

Example 14

A charge of 640 parts of HfCl₄ was reacted as above described with 92 parts of sodium (50% of theoretical) in a continuous manner at a temperature of 150° C. These amounts of reagents yielded a reduction mixture in which the HfCl₄ was approximately one-half reduced, i.e., theoretically to hafnium dichloride. At this point the remainder of the required sodium, 92 parts, was added into the top of the sintering vessel just before placing the sintering vessel into the furnace which was held at 900° C. A period of 30 minutes was required to bring the temperature of the contents of the sintering pot to the melting point of sodium chloride, after which 2 hours additional time at 900° C. was allowed for completion of sponge growth. The sintering vessel was removed from the furnace as above described, cooled, opened and the hafnium sponge and salt mixture removed for washing. In this case the sponge was washed with 1% HCl and then with water. The hafnium sponge yield was about 90% of theoretical yield.

*Example 15*

A quantity of 640 parts $HfCl_4$ was reacted as described above with 110 parts of sodium at a temperature of 250° C. This amount of sodium was 60% of that required to reduce the $HfCl_4$ to hafnium metal. The solid powdery mixture was transferred continuously from the reactor to a sintering vessel as shown in the accompanying drawing. The sintering vessel was disconnected from the system while being maintained at all times under an argon atmosphere. An additional 75 parts of sodium was added to the sintering vessel after which it was lowered into a fused salt bath at 850° C. The temperature increased to 125° C. in ten minutes and then increased very rapidly due to internal heat provided by the reaction of the sodium and lower chlorides of hafnium. The temperature was maintained at 900° C. for ten hours following which the sintering vessel was removed from the furnace and allowed to cool. The hafnium sponge was recovered from the salt by leaching out the latter with water. The hafnium sponge had an average Brinell hardness of 192.

*Example 16*

The same procedure was followed as in Example 15 except that the contents of the sintering vessel were heated for 4 hours at 980° C. The recovered hafnium sponge appeared essentially identical to that recovered in Example 15. Brinell hardness was 225.

*Example 17*

The preparation of the finely divided hafnium dichloride-salt mixture was identical with that of Example 15, except that 32 parts of hafnium tetrachloride were reacted with 4.6 parts of sodium. To this mixture in the sintering vessel was added 2.3 parts of sodium following which the vessel was immersed in the furnace. The temperature was allowed to rise to between 800 and 900° C. The remainder of the sodium for stoichiometric reaction was added in increments of one part each at intervals of 15 minutes, i.e., one part after fifteen minutes, one part after 30 minutes and 0.3 part after 45 minutes. The vessel and contents were then held at 900–950° C. for one hour following which they were removed from the furnace. The vessel was turned on its side to allow the molten salt to drain away from the hafnium metal. After cooling to room temperature, the hafnium metal was removed and separated from the salt. Average hardness of a composite sample of the hafnium metal product was 152 Vickers.

*Example 18*

A charge of 480 parts of $HfCl_4$ was reacted in the previously described manner with 41.5 parts of sodium at a temperature of 325° C. This amount of sodium corresponded to that required for a 30% reduction of the $HfCl_4$. The reduction was then discontinued and the remainder of the sodium required, 97 parts, added to the top of the sintering vessel just before placing the vessel into the furnace which was held at a temperature of about 700° C. A period of 15 minutes was required to raise the temperature of the contents of the sintering vessel to 925° C. Sufficient heat was released during this period to raise the temperature of the fused salt in the salt bath to 890° C. after which it was raised to 925° C. by gas heating. The sintering vessel and contents were held at 925° C. for 1½ hours, after which they were removed from the furnace and allowed to cool. The recovered hafnium sponge amounted to a yield of approximately 89%.

*Example 19*

A charge of 640 parts of $HfCl_4$ was reacted with 166 parts of sodium (90% of the stoichiometric theoretical amount required for complete reduction). The reaction was carried out at temperatures maintained at approximately 400° C. The resulting solid, dry powdery mixture of hafnium, hafnium subhalides, and salt was then subjected to sintering at temperatures of about 900° C. Additionally, there was added 18 parts of sodium at the beginning of the sintering period. Heating was continued for about 19 hours, after which the vessel was removed from the heating furnace as described above and the hafnium metal removed and leached. An 85% yield was obtained.

*Example 20*

Another reaction was carried out similar to that described in Example 12 except that 640 parts of $HfCl_4$ and 46 parts of sodium were reacted at 200° C. in the initial step. This amount of sodium corresponded to that required for 25% of total reduction. The resulting dry, solid mixture was transferred to a sintering furnace, 138 parts of additional sodium added, and the charge was heated for 4 hours at 960° C. The resulting massive hafnium metal amounted to about 91% of the theoretical yield.

*Example 21*

A charge of 141 parts of $MoCl_5$ and 25 parts of sodium were added semi-continuously to a stirred bed of finely divided sodium chloride used as a "heel." The reduction reaction proceeded readily in the 150 to 325° C. temperature range. The 40% reduction product was then transferred under an argon atmosphere to the sinter pot which contained 37 parts of sodium, the balance required for stoichiometric reduction. The sintering vessel and its contents were then placed in a 900° C. salt bath furnace for 5 hours, following which the sintering vessel was removed and tilted so that the salt drained from the metal. 45 parts of molybdenum metal were recovered as powder which was a 91.2% yield.

*Example 22*

A partial reduction of ferric chloride with sodium metal was carried out using 366 parts of $FeCl_3$ and 52 parts of sodium by feeding both continuously onto a bed of sodium chloride contained in a flask and stirred by a sweep stirrer and maintained under an argon atmosphere. Temperature was controlled between 175 and 225° C. during the reduction step. The reduction charge was then transferred into the sintering vessel or tube (a 20 inch length of stainless steel pipe carrying a 1" x 20" sidearm at the top) containing 104 parts of sodium to complete the reduction to metallic iron. The charge was then sintered for 5 hours at 900° C., the pot was cooled on its side, and opened by grinding off the bottom at the weld. A total of 98 parts of soft sponge iron, equivalent to a 77.5% yield, was recovered from the salt-iron sponge after leaching and drying.

*Example 23*

A charge of 79 parts of $CrCl_3$ powder was reacted with 11.5 parts of sodium at 150–250° C. on a stirred bed of sodium chloride as described in previous examples. The reduction product consisting substantially of $CrCl_2$ and NaCl was transferred under argon to the sintering pot. An additional 23 parts of sodium were added on top of the finely divided mixture. The pot was placed in a salt bath held at 900° C. where the additional sodium reacted after which the pot and contents were held in the salt bath for about 4 hours. The pot, on removal from the salt bath, was tilted to decant the molten salt from the metal mass which adhered lightly to the bottom of the sinter vessel. After cooling to room temperature the metal and salt mixture was washed and dried. A yield of 24 parts of chromium metal was obtained, a substantial portion of which was in crystalline form.

Example 24

A charge of 29.9 parts of SbCl$_5$ and 4.6 parts of sodium is fed into a reaction vessel containing a heel of partially reduced antimony subchlorides and salt from a previous run. This heel appears to be a double salt containing 2 mols of NaCl per mol of SbCl$_3$ and is of the general composition Na$_2$SbCl$_5$. It is a free flowing powder at the reduction temperature, and the partial pressure of SbCl$_3$ over the double salt is much lower than what would be expected if the by-product salt were not present. After the charge has been added to the reaction vessel, partial reduction of the SbCl$_5$ is carried out at a temperature of about 125° to 175° C.

The resulting partially reduced antimony salt powder is then passed to a sintering vessel, and the amount of sodium required to complete the stoichiometric reduction added. The reaction commences at about 100° to 130° C., and the whole reaction mass rises to a temperature above the melting point of salt in a matter of about 5 to 10 minutes. Since the antimony is liquid at this temperature, prolonged heating (e.g. 2 to 10 hrs.) in the sintering vessel is not necessary and is, in fact, unadvisable. It is preferable to stop the sintering operation while the antimony is still dispersed in the form of "gravel" rather than to allow the "gravel" form to coalesce in a single metal mass or phase. The "gravel" form is easier to wash, while the latter form would be more difficult to handle. After the antimony "gravel" has cooled in the by-product salt, it is removed from the sintering vessel and washed to dissolve away the salt. The antimony "gravel" is then dried, and it is ready to be used commercially or further processed. The absence of metal fines in product has the advantage of permitting easier separation of the metal and decreases the possible hazards.

Other methods of separating those metals prepared by the present process which have lower melting points than the by-product salt include, for example, distilling the metal from the reaction product mixture, adding water or other carrier liquid to the reaction product mixture to effect a flotation type separation of the metal, and direct removal of a layer of the metal if phase separation occurs. It will be understood further that other conventional metal separation techniques known to the art may be effectively employed.

What is claimed is:

1. A process for the production of a multi-valent metal from a halide of higher valence and reducible to at least one halide of lower valence of said metal which comprises the following separate steps: (A) reducing at least one halide of a multi-valent metal with an amount of alkali metal at least sufficient to reduce said higher halide to a halide of lower valence but insufficient for stoichiometric reduction to the metal, thereby controlling the reaction temperature within a range from the melting point of the alkali metal up to the melting point of the reaction mixture, said reaction mixture comprising halides of lower valence of the multi-valent metal and the corresponding alkali metal halide, to prevent the occurrence of hot spots and the formation of fused multi-valent metal, and forming an easily stirred, solid, finely divided mixture of halides of lower valence of the multi-valent metal and the corresponding alkali metal halide, which is stirred during said reduction reaction; (B) recovering said solid, finely divided mixture and subjecting it to reaction with the required amount of additional alkali metal for stoichiometric reduction of said halides of lower valence in said mixture to form the corresponding multi-valent metal and utilizing the resulting heat of reaction in heating the mixture to a sintering temperature above the melting point of the alkali metal halide produced, so as to lower the time required to attain a sintering temperature; (C) maintaining said sintering temperature for a sufficient period of time to complete sintering of said multi-valent metal; and (D) isolating the multi-valent metal from the resulting reaction mixture.

2. The process of claim 1 wherein the amount of alkali metal employed in step (A) is from about 20 to 90% by weight of the stoichiometric amount required for reduction of said halide to the metal.

3. The process of claim 1 wherein the amount of alkali metal employed in step (A) is from about 25 to 75% by weight of the stoichiometric amount required for reduction of said halide to the metal.

4. The process of claim 1 wherein step (A) is carried out at a temperature of from about 150° C. up to about 400° C.

5. The process of claim 1 wherein said sintering temperature is within the range of about 805° to 1050° C.

6. A process for the production of a multi-valent metal from a metal polychloride in which the metal has a higher valence, said metal polychloride being reducible with sodium to at least one metal chloride in which the metal has a lower valence which comprises the following separate steps: (A) reacting said metal polychloride with an amount of sodium at least sufficient to reduce said metal polychloride to a metal chloride in which said metal has a lower valence but insufficient for stoichiometric reduction to the metal at a temperature within the range between the melting point of sodium and the melting point of the reaction mixture, said reaction mixture comprising subchlorides in which said multi-valent metal has a lower valence and sodium chloride, thereby controlling the reaction temperature to prevent the occurrence of hot spots and the formation of fused multi-valent metal, and forming an easily stirred, solid, finely divided mixture of subchlorides in which said multi-valent metal has a lower valence and sodium chloride, which is stirred during said reduction reaction; (B) recovering said solid, finely divided mixture and subjecting it to reaction with the required amount of additional sodium for stoichiometric reduction of said multi-valent metal halides of lower valence in said mixture to form the corresponding multi-valent metal and utilizing the resulting heat of reaction in heating the mixture to a sintering temperature above the melting point of the alkali metal halide produced, so as to lower the time required to attain a sintering temperature; (C) maintaining said sintering temperature for a sufficient period of time to complete sintering of said multi-valent metal; and (D) isolating the multi-valent metal from the resulting reaction mixture.

7. The process of claim 6 wherein the amount of sodium employed in step (A) is from about 20 to 90% by weight of the stoichiometric amount required for reduction of said metal polychloride to the metal.

8. The process of claim 6 wherein said sintering temperature is above about 805° C.

9. The process of claim 6 wherein all of the additional sodium required to complete the reduction to the multi-valent metal is initially reacted with the solid, finely divided mixture comprising said multi-valent metal subchlorides and sodium chloride in step (B).

10. The process defined in claim 6 in which the multi-valent metal is zirconium and the metal polychloride is zirconium tetrachloride.

11. The process defined in claim 6 in which the multi-valent metal is hafnium and the metal polychloride is hafnium tetrachloride.

12. The process defined in claim 6 in which the multi-valent metal is tantalum and the metal polychloride is tantalum pentachloride.

13. The process defined in claim 6 in which the multi-valent metal is niobium and the metal polychloride is niobium pentachloride.

14. The process defined in claim 6 in which the multivalent metal is titanium and the metal polychloride is titanium tetrachloride.

References Cited in the file of this patent

UNITED STATES PATENTS

| | | |
|---|---|---|
| 2,703,752 | Glasser et al. | Mar. 8, 1955 |
| 2,826,493 | Garrett et al. | Mar. 11, 1958 |
| 2,830,888 | Wade | Apr. 15, 1958 |

FOREIGN PATENTS

| | | |
|---|---|---|
| 717,930 | Great Britain | Nov. 3, 1954 |
| 762,541 | Great Britain | Nov. 28, 1956 |